Nov. 19, 1968  W. ABELS  3,411,322
GEAR COUPLING HAVING AUTOMATIC ENGAGEMENT MEANS
Filed March 13, 1967  3 Sheets-Sheet 1
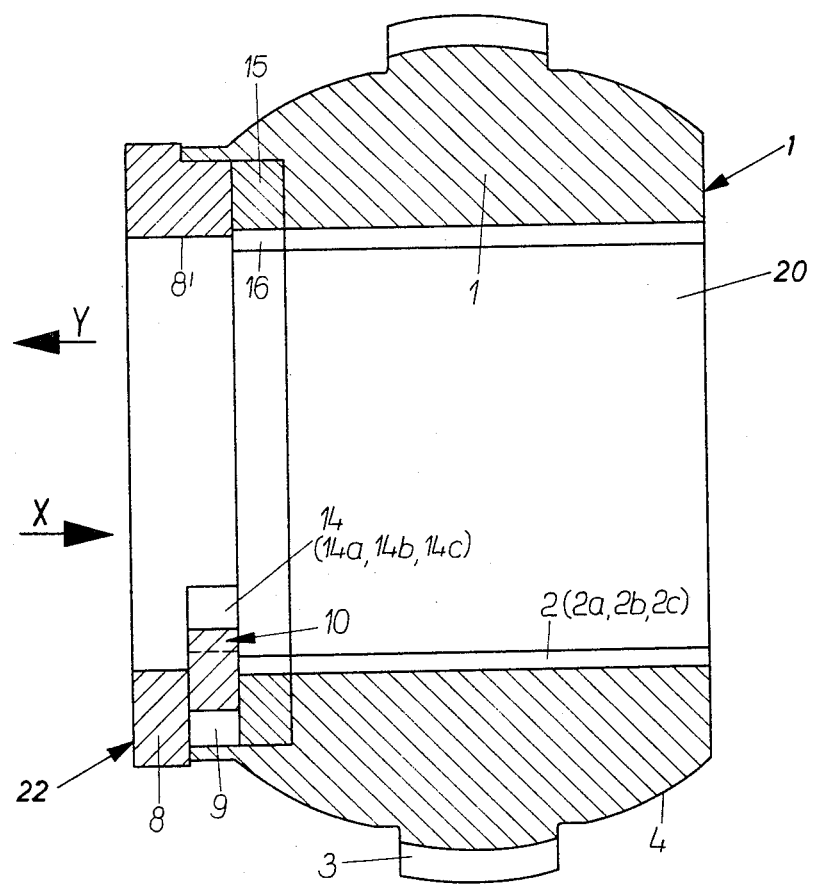
Inventor
WALTER ABELS
By McGlew and Toren
Attorneys Nov. 19, 1968 W. ABELS 3,411,322
GEAR COUPLING HAVING AUTOMATIC ENGAGEMENT MEANS
Filed March 13, 1967 3 Sheets-Sheet 2

Inventor
WALTER ABELS
By McGlew and Toren
Attorneys

Nov. 19, 1968   W. ABELS   3,411,322
GEAR COUPLING HAVING AUTOMATIC ENGAGEMENT MEANS
Filed March 13, 1967   3 Sheets-Sheet 3

Inventor
WALTER ABELS
By McGlew and Toren
Attorneys

United States Patent Office 3,411,322
Patented Nov. 19, 1968

3,411,322
GEAR COUPLING HAVING AUTOMATIC
ENGAGEMENT MEANS
Walter Abels, Bochum, Germany, assignor to DEMAG
Aktiengesellschaft, Duisburg, Germany
Filed Mar. 13, 1967, Ser. No. 622,762
Claims priority, application Germany, Mar. 17, 1966,
Z 12,109
8 Claims. (Cl. 64—6)

ABSTRACT OF THE DISCLOSURE

The construction of a gear coupling is described in respect to a single embodiment which includes a ball member having an external gear formation and a partial spherical surface adjacent the gear formation and including a bore defined therethrough with gearing including axially elongated gear teeth extending completely around the interior periphery of the bore.

---

In accordance with the invention, one end of the bore of the ball member is provided with a sleeve or an attachment to facilitate the automatic coupling of the gearing of a pin with the gearing of the ball member. The coupling sleeve for the ball member includes a ring-shaped segment which is mounted within a recess of a sleeve attachment in a manner such that it may be pivoted at its one end about an axis which is substantially parallel to the axis of the ball member bore. The segment is urged by the biasing of a spring outwardly from its recess within the sleeve member so that a plurality of teeth which project outwardly from the inner surface of the segment member project above the teeth of the ball member bore and are offset from these teeth so that each tooth of the segment aligns with a corresponding space between teeth of the bore. The pin member which is to be engaged by its exterior teeth with the teeth on the interior of the bore of the ball member is provided with an inwardly bevelled or tapered end with the teeth narrowing to the outer end of the pin at such location in order to facilitate the entry of the teeth into the coupling sleeve.

In accordance with a further feature of the invention, the sleeve member is mounted on one side of the ball member over a ring member made of a material having a very smooth surface such as a polyamide. The ring member has teeth which are aligned with the teeth of the bore of the ball member to provide an initial smooth movement surface for the teeth of the coupling pin when the parts are interconnected. For this same purpose, the segment arm is advantageously made of a similar material.

BRIEF SUMMARY OF THE INVENTION

The invention relates, in general, to gear couplings and, in particular, to a new and useful gear coupling including a female part having internal gearing engageable by a male part having external gearing and with means for automatically adjusting the position of the teeth of the male part to align with and interengage with the internal gearing of the female part.

Couplings of the general type to which the invention refers are either used alone or as coupling spindles in combination with ball and socket joints or as rolling mill couplings.

The inventive construction is such that teeth of the pin member which are tapered to substantially a point at their outer end engage in the spaces between the teeth carried by the segment member or they will deflect the segment member teeth outwardly as the pin member enters the sleeve coupling. Because of the taper of the teeth of the pin member and because of the mounting of the segment member so that it may be pivoted, a further inward movement of the pin will result in the pin being turned when misaligned with the ball member teeth by engagement of the pin member teeth between the teeth of the ball member. The turning is caused by the displacement of the segment member backwardly within its recess of its associated sleeve coupling to a position at which the teeth of the segment member align with the teeth of the bore of the ball member to thereby cause the teeth of the pin member to align with the spaces between the teeth of the bore of the ball member and to permit the easy and further insertion of the pin member into the bore for complete interengagement of the teeth of the pin and ball members. In order to facilitate the threading of the drive shaft during the coupling, the coupling sleeves of the known coupling elements are provided with a widened inlet end which tapers inwardly toward the coupling mouth or the coupling pin is provided with a conically tapering entering end in order to facilitate the entrance of one part into the other. Even with the centering arrangements described, the threading is still laborious and time consuming because when the coupling halves strike against each other when their teeth are not properly aligned so that the teeth of one part engages in the space between the teeth of the other part, it is necessary to slowly turn one part in respect to the other in order to align the teeth as necessary to permit smooth interengagement of the teeth. Such an arrangement in addition to providing unavoidable damaging of the coupling during the frequent striking of the teeth of the coupling halves provide difficulties in the handling and interengagement.

In accordance with the invention, there is provided a coupling with a coupling attachment for facilitating the alignment of the gear teeth of one part with the spaces between gear teeth of the other part and which includes a spring-loaded ring-shaped threading arm or segment member which is mounted for pivotal movement in a radial plane in a recess provided in a centering wheel or coupling sleeve which is disposed between the female and male parts of the coupling. The threading arm is provided with a plurality of teeth, for example, about three which project inwardly from the coupling attachment which advantageously is fitted to the female member adjacent the bore of the member having the internal gearing. The pitch of the teeth on the threading arm corresponds to that of the coupling toothing. The biasing means acting on the threading arm project the teeth outwardly from their outer annular position into a position at which the teeth are displaced so that they align with the spaces between teeth of the internal gearing of the female coupling member. The segment member may be pivotally moved so that it will be displaced against the biasing force inwardly to a location in which the teeth align with the teeth of the internal gearing. The male part of the coupling advantageously includes external teeth which are bevelled inwardly substantially to a point adjacent to one end and this end is also tapered toward the center in order to facilitate initial insertion of the male member into the female member. The coupling attachment is so located that the teeth of the male member will engage in the spaces between teeth of the segment member at their narrowed or pointed ends and further insertion movement of the male member into the female member will cause a slow pivotal movement of the threading arm to displace the arm and teeth thereon outwardly and radially and to cause a movement of the pin (when the teeth are centrally misaligned) until the teeth thereon are properly aligned with the spaces between teeth of the internal gearing defined on the female member. If, on the other hand, the teeth of the coupling pin are already aligned with the teeth of the internal gearing of the female member, the pointed ends of these teeth will initially engage the gear portions of the threading arm. The taper of the male coupling part is such, however, that the engagement will cause the outward movement and thereafter rotary movement of the threading arm until the teeth of the segment arm also interengage with the teeth of the coupling arm as the insertion progresses.

A further feature of the invention is that the coupling attachment includes a ring member having teeth which are made of a plastic having a high surface smoothness such as polyamide and which is arranged between the threading member and the internal gearing of the female coupling part in order to provide a smooth sliding transition surface for the sliding movement of the male coupling part during its turning for aligning its teeth for interengagement with the internal gearing of the female coupling part.

Accordingly, it is an object of the invention to provide an improved coupling device for facilitating the turning of a male part in respect to a female part to insure proper alignment of the hearing of each part for proper interengagement.

A further object of the invention is to provide a sleeve attachment for a female coupling part having a threading arm with internal gearing for turning a male coupling part to properly align the teeth of the male coupling part in respect to the spaces between teeth of the gearing of the female coupling part and the threading arm being pivotally mounted so that it will project with its teeth into the receiving bore of the female part, the male member having teeth bevelled inwardly toward the outer end and downwardly toward its axis so that upon entrance of the teeth into the female coupling part, the treading arm teeth will engage on each side of the coupling member if they are misaligned and during further insertion movement will rotate the male coupling part to align the teeth for engagement with the internal gearing of the female coupling part.

A further object of the invention is to provide a coupling which is simple in design, rugged in construction and economical to manufacture.

The various features of novelty which characterise the the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the drawings:

FIG. 1 is an axial sectional view of a female coupling part having a tooth alignment device constructed in accordance with the invention;

DETAILED DESCRIPTION

Figures 2, 3:
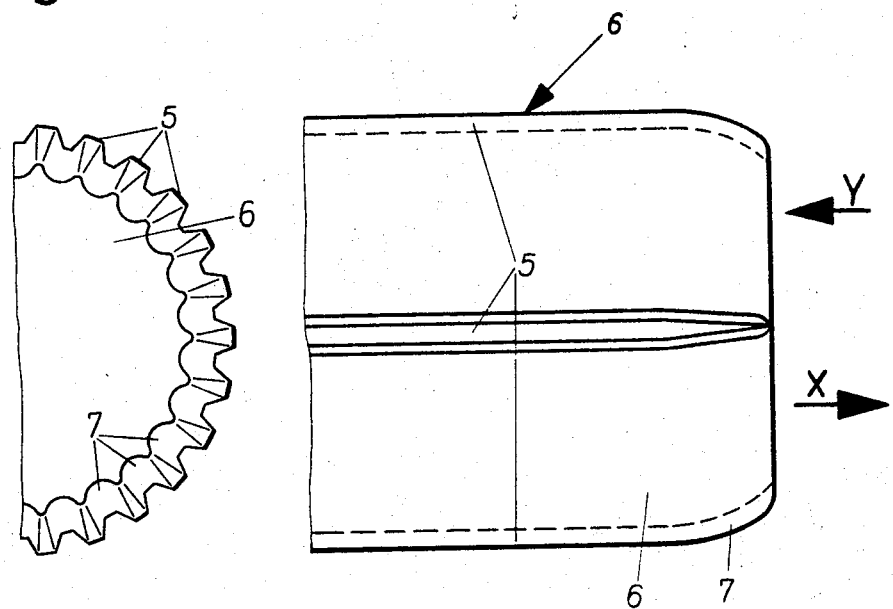
FIG. 2 is a side elevational view of a coupling male part for use with the coupling of FIG. 1.
FIG. 3 is a partial end elevational view of the coupling male part shown in FIG. 2.

Referring to the drawings, in particular, the invention embodied therein comprises a coupling female part generally designated 1 (FIG. 1) which is adapted to interengage with a coupling male part generally designated 6 (FIG. 2). In the embodiment illustrated, the female part 1 comprises a ball member having a spherical surface 4 for a male socket joint part and including an external tooth formation 3 forming an external gear. The ball member 1 is provided with an internal bore 20 having internal gearing including axially extending gear teeth 2 defined around the interior surface thereof.

In accordance with the invention, there is provided coupling teeth aligning means generally designated 22 for aligning the teeth 5 of the coupling male part 6 with the spaces between the teeth of the internal gearing 2 of the female part 1. The aligning means 22 includes a ring or coupling sleeve member 8 having a smooth bore portion 8′ with a recess 9 which accommodates a segment-shaped or half-ring-shaped threading arm or segment member generally designated 10. The segment member 10 is provided with a plurality of teeth in this instance three, namely 14a, 14b and 14c having a pitch which corresponds to that of the gearing 5 on the coupling male part 6 and the gearing 2 on the coupling female part 1. The segment 10 is biased outwardly by a spring 12 confined in a recess defined in the ring member 8 so that the teeth 14a, 14b and 14c are displaced out of alignment with teeth 2a, 2b and 2c of the gearing 2 of the female member 1. The segment member 10 may be moved inwardly to cause displacement of the teeth 14a, 14b and 14c in a spiral path until they align precisely with the teeth 2a, 2b and 2c of the gearing 2. The segment 10 is mounted on a pivot 11 and it is shaped so that it can move outwardly up to the end position at which the teeth 14, 14b and 14c are exactly aligned with the spaces between teeth of the corresponding teeth of the gearing 2. In the at rest position, they assume the solid line position indicated in FIG. 3.

In order to facilitate the initial entry into the female part of the male part 6, the male part, in the embodiment illustrated, comprises a coupling pin having individual teeth 5 formed with their outer ends tapering substantially to a point as indicated in FIG. 2. The tapering of the teeth is advantageously located at a bevelled area 7 adjacent the end of the pin. The taper of the pin at the location 7 is inwardly toward the axis of the pin in order to facilitate the initial centering of the pin in respect to the smooth bore 8′ which is of a diameter somewhat greater than the adendum diameter of the gear teeth 5 of the coupling pin 6. Due to the tapered form of the end of the pin 6 and of the teeth 5, the coupling pin 6 will receive a slight twisting movement even if the teeth are aligned so that they initially abut against the teeth 14a, 14b and 14c which project from the segment 10. The bevel of the pin 6 at the area 7 also will cause the pin member to deflect the segment 10 outwardly against the force of the springs 12. If the teeth 5 initially contact the segment at a location between the teeth 14a, 14b and 14c, the displaceable movement of the segment 10 by the insertion of the pin 6 will cause a rotation of the coupling until the teeth 5 align with the spaces between the teeth of the gearing 2. When this is accomplished, the coupling pin 6 is in a position at which the complete insertion may be effected with the gears 5 aligned in the spaces between the teeth 2a, 2b and 2c of the gearing 2.

A feature of the invention is the provision of an insert ring member or washer 15 which carries interior gearing or gear teeth 16 which corresponds to the gearing 2 of the ball member 1. The insert 15 is made of a material having a high surface smoothness such as a polyamide and it provides a reduced friction area to permit easy threading turning movement of the coupling pin 6 during its entrance.

Figure 4:
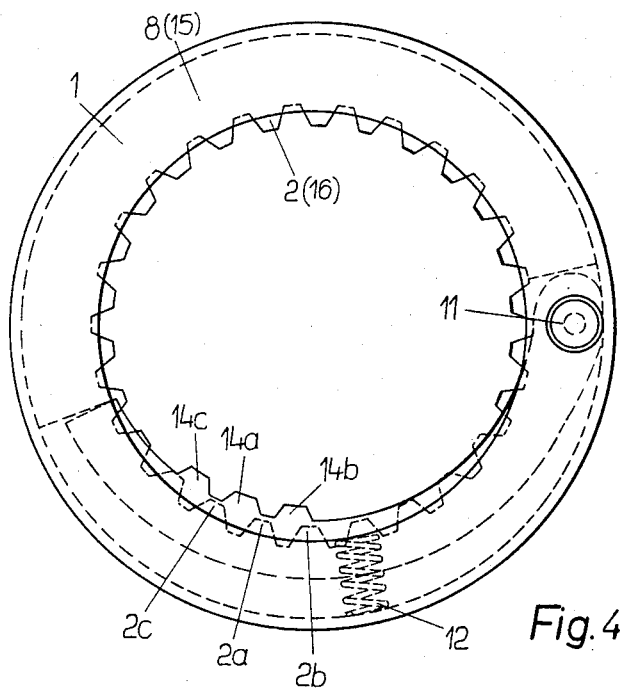
FIG. 4 is an entrance and side view of the coupling female part indicated in FIG. 1.
Figure 5:
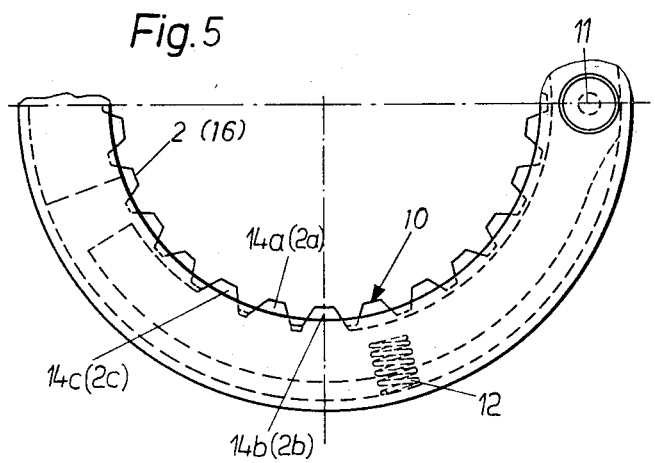
FIG. 5 is a partial view similar to FIG. 4 indicating the threading arm in another position.

When the coupling pin is inserted, the segment 10 is disposed in the position indicated in FIG. 3, but before the pin is inserted up to the gearing 2 of the ball member 1, the segment 10 will be displaced by the pin to the position indicated in FIG. 4 at which the gears 14, 14b and 14c align with the gearing 2 and 16.

While a specific embodiment of the invention has been shown and described in detail to illustrate the application of the inventive principles, it will be understood that the invention may be embodied otherwise without departing from such principles.

What is claimed is:
1. A coupling comprising, a female coupling part having a bore with internal gearing with radially spaced axially extending teeth defined around the surface of the bore, a male coupling part having gearing with radially spaced axially extending teeth engageable between the teeth of said female part, a gear aligning member disposed between said female coupling part and male coupling part including a threading member having aligning gear teeth, means movably mounting said threading member to permit movement of said threading member between a position at which said aligning gear teeth project above the gear teeth of said female coupling part and at which they are out of alignment with the teeth of said female coupling part and to a position displaced outwardly and in radial and circumferential directions at which the aligning gear teeth align with the gear teeth of the female coupling part, and biasing means for biasing said segment member to a position at which the aligning gear teeth project above said gear teeth of said female coupling part and out of alignment therewith, said male coupling part being movable relative to said female coupling part for coupling engagement in a direction toward said aligning gear teeth and displacing said segment with said aligning gear teeth to an outward position at which the gear teeth align with the gear teeth of said female coupling part, the teeth of said male coupling part being engageable when they are initially not aligned with the gear teeth of said female coupling part with the spaces between aligning gear teeth whereby movement of said threading member causes a twisting movement of said male coupling part to align the gear teeth of said male coupling part with the gear teeth of said female coupling part as it moves past said threading member.

2. A coupling according to claim 1, including a ring member disposed between said gear aligning member and said female coupling and providing a bore with gearing comparable to the gearing of said female coupling part of a material defining a smooth sliding surface to permit easy sliding movement of said male coupling part during turning thereof upon entrance into said female coupling part.

3. A coupling, according to claim 2, wherein said ring member includes gearing formed of a material such as polyamide.

4. A coupling, according to claim 1, wherein said male coupling part includes a coupling end which is tapered inwardly toward the axis of said male coupling part, said male coupling part gearing tapering inwardly toward the end of said male coupling part.

5. A coupling, according to claim 1, wherein said gear aligning member comprises a sleeve connected to one end of said female coupling member and having an outer smooth bore at the entrance to the bore of said female coupling part.

6. A coupling, according to claim 1, wherein said female coupling part comprises a ball member having a partial spherical surface to permit said member to be universally supported.

7. A coupling, according to claim 6, including gearing defined around the exterior of said ball member.

8. A coupling, according to claim 1, wherein said gear aligning member comprises a ring-shaped member engaged with one end of said female coupling member, said male coupling member comprising a coupling pin having one end forming a coupling end which is tapered inwardly toward the center adjacent said coupling end, said teeth of said male coupling part being tapered inwardly toward said coupling end and an insert having a bore with internal gearing corresponding to the bore and internal gearig of said female coupling part and being of a material providing a smooth relatively low frictional surface to facilitate rotative twisting movement of said coupling male part during entrance into said female part.

References Cited

UNITED STATES PATENTS 2,525,695  10/1950  Lombard _____ 64—9
2,796,750   6/1957  Crankshaw _____ 64—8
2,823,527   2/1958  Belden et al. _____ 64—9

HALL C. COE, *Primary Examiner.*